Patented May 14, 1940

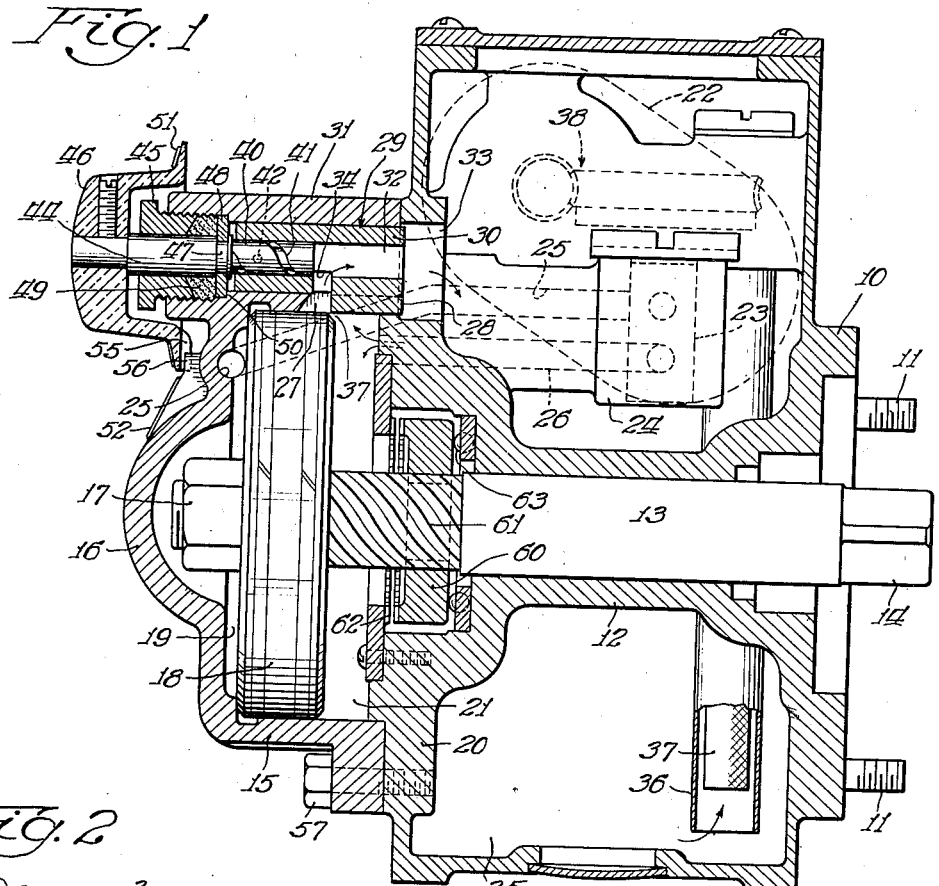
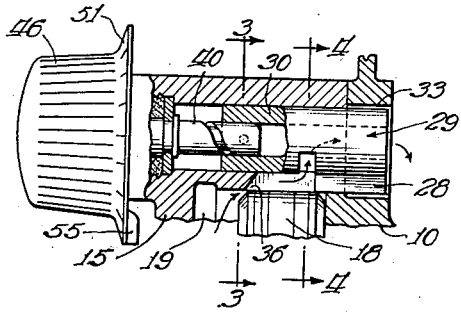
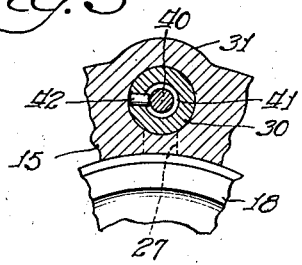
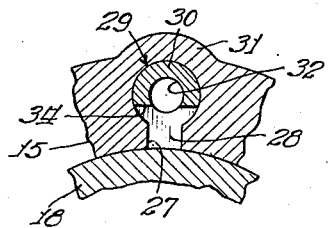
Inventors:
Harold N. Bliss and
George E. Fenton.
By: Edward C. Gritzbaugh
Atty.

2,200,832

UNITED STATES PATENT OFFICE 2,200,832

HYDRAULIC DRIVE MECHANISM

Harold N. Bliss and George E. Fenton, Ithaca, N. Y., assignors to Morse Chain Company, Ithaca, N. Y., a corporation of New York Application June 9, 1939, Serial No. 278,378

9 Claims. (Cl. 121—135)

This invention relates to hydraulic drive mechanism of a type which is adapted for use, for example, in driving the feed screw of a stoker. In a transmission of this type, provision is made for adjusting the length of stroke of the reciprocating drive member, by adjusting a valve which controls the escape of the pressure fluid at the end of the piston stroke. The invention deals particularly with this valve mechanism, and has as its object to provide an improved hydraulic transmission of the type indicated, wherein the valve is of relatively simple and inexpensive, yet exceedingly durable construction, involving no moving parts, and yet providing for very fine adjustments of the piston stroke.

Specifically, the invention contemplates an arrangement wherein the stroke of the piston is determined by the escape of fluid through a port in a lateral wall of the cylinder in which the piston operates, which port is adjustable in extent by means of a valve element having a portion extending into the port and defining one extremity thereof.

An embodiment of the invention is illustrated in the accompanying drawing, in which:

Fig. 1 is an axially sectional view of a hydraulic drive mechanism incorporating the invention, the piston being illustrated at the end of its return stroke;

Fig. 2 is a detailed transverse sectional view of the valve, and adjacent portions of the transmission, the piston being shown at the forward limit of its advancing stroke;

Fig. 3 is a detailed transverse sectional view taken on the line 3—3 of Fig. 2; and Fig. 4 is a detailed sectional view taken on the line 4—4 of Fig. 2.

As an illustration of one form in which the invention may be embodied, we have shown in Fig. 1 a portion of a stoker drive of the general type illustrated in the pending application, Serial No. 219,714 of H. N. Bliss and G. E. Fenton, filed July 18, 1938, for Feeding apparatus. Reference is made to that application for details of construction of the feeding apparatus in which the invention is embodied.

A hydraulic drive mechanism of this type may embody a transmission case 10 having studs 11 by which it may be secured to one end of a conveyor screw conduit, and having in its central region a bearing 12 in which may be mounted, for combined reciprocating and oscillating movements, a piston rod 13 having at one end a squared or splined shank 14 adapted to form a driving engagement with the socket end of a conveyor screw.

To one end of the transmission case 10 is secured a cylinder 15 having a head 16. Mounted upon the rear end of the piston rod 13, as by means of a nut 17, and snugly fitted within the bore of the cylinder 15, is a piston 18 which forms, between itself and the end wall 16, a chamber 19, and between itself and the rear wall 20 of the transmission case 10, a chamber 21. The piston 18 is adapted to be driven back and forth by fluid under pressure introduced alternately into the chambers 19 and 21.

Fluid under pressure is supplied to the piston chambers by means of a pump, indicated in dotted lines at 22, and is directed alternately to the chambers 19 and 21 by means of a directing valve 23, rotatable in a valve cylinder 24 and adapted to direct fluid from the pump alternately through a duct 25 leading to the piston chamber 19, and a duct 26 leading to the piston chamber 21.

In the lateral wall of the cylinder 15 is a fluid escape port 27 one axial extremity of which is defined by the wall of the cylinder 15 and the other axial extremity of which is defined by an axially adjustable key 28 forming part of an axially adjustable valve 29. The valve 29 includes the key portion 28 and a cylindrical sleeve portion 30 which is axially slidable in a cylindrical valve chamber 31 formed integrally with the piston cylinder 15. The hollow interior of the sleeve 30 forms a duct 32 which communicates at the forward end of the valve, with the interior of the transmission case 10 through an opening 33 in the rear wall 20 thereof. A slot 34 in the sleeve portion 30 of the valve, just rearwardly of the key 28, establishes communication between the port 27 and the duct 32, so that when the piston 18 is at either end of its stroke, pressure fluid may escape past the piston through the port 27, the slot 34 and the duct 32, into the sump 35 formed in the bottom of the transmission case 10, from which it may be drawn through an inlet tube 36 and filter 37 into the pump 22 for redistribution back to the chambers 19 and 21.

The limit of forward movement of the piston is fixedly determined by uncovering the port 27 by the rear side of the piston 18 so as to provide a passageway 36 between the rear side of the piston and the fixed rear extremity of the port 27 as shown in Fig. 2. The limit of return stroke of the piston is adjustably determined by uncovering the port 27 by the forward side of the piston, so as to provide a passageway 37 between the forward side of the piston and the adjustable valve key 28. Assuming the piston to be commencing its forward stroke, fluid under pressure delivered into the chamber 19 through the port 25 from the pump 22 will force the piston 18 forwardly until the port 27 is uncovered to establish the passageway 36, and any remaining fluid under pressure which may continue to come through the duct 25, will be vented through the passage 36, the port 27, the slot 34, and the duct 32, to the sump 35. The valve 23, which is rotated by worm-gearing indicated generally at 38 in dotted lines, will, shortly after the piston has reached its forward limit of travel, cut off the flow of pressure fluid through the duct 25 and divert the flow through the duct 26 into the chamber 21. The piston will then commence to move rearwardly until the port 27 is uncovered to establish the passage 37. The pressure fluid in the chamber will then be vented through the passage 37 back to the sump 35 until the valve 23 has again reversed the flow.

In the position of valve adjustment shown in Fig. 1, the piston has a maximum length of stroke, being substantially in contact with the cylinder head 16 at the rear end of its stroke. As the valve 29 is adjusted to the right as viewed in Fig. 1, the port 27 will be uncovered, i. e., the passage 37 will be established at an earlier point in the return stroke of the piston. As a result, the stroke of the piston will be shortened, and the period of venting through the passage 37 will be lengthened.

The opening 33 in the wall 20 of the transmission case is of sufficient diameter to receive the valve 29 as the latter is shifted axially.

Axial shifting of the valve is accomplished by an adjusting screw 40 having a helical groove 41 into which is extended a pin 42 mounted in the sleeve portion 30 of the valve 29 as shown in Figure 3. The screw 40 has an enlarged shaft portion 44 which extends through a packing gland 45 and carries at its outer end a dial knob 46. The screw 40 is formed with an annular groove 47 into which projects the two separated halves of a two-piece washer 48 secured between the packing ring 49 of the packing gland 45 and a shoulder 50 forming the forward extremity of the packing gland chamber. The washer 48 forms an end thrust bearing for the adjusting screw.

The dial knob 46 may be provided with a dial scale 51 adapted to cooperate with an indicator mark 52 embossed on the rear wall 16 of the cylinder 15.

As the dial knob 46 is rotated, the screw 40 will coact with the pin 42 to move the valve 29 axially, thereby adjusting the length of the port 27. The exact length of piston stroke may be read directly upon the dial scale.

The inner extremity of the valve key 28 is shaped to form a continuation of the bore of the cylinder 15, as shown in Figure 4. Thus the key in effect forms a part of the wall of the cylinder against which the piston 18 will seal as soon as it has closed the port 26.

The control knob 46 is provided on the forward side of its rim, with a lug 55 adapted to engage a projection 56 on the cylinder head 16 at the extremities of valve adjustment. Thus the full range of valve adjustment is determined by slightly less than one complete rotation of the knob 46.

The present invention has the advantage that the valve possesses no moving parts to produce wear. The valve may be adjusted more rapidly and with greater facility than prior valves, and has a better visibility for adjustment. It is less expensive than prior valves because it permits the use of a die casting for the control knob as well as for the valve. It permits the extension of the piston rod 13 through the cylinder head 16 if this should be desired, as for instance in order to permit the use of the piston rod extension for driving other mechanism. The invention also has the advantage that the cylinder head 16 may be cast in a single unit and simply bolted onto the transmission case 10 as at 57.

The reciprocating movement of the piston rod 13 is transformed into a combined reciprocating and oscillating movement, by means of a clutch ring 60, threaded upon a screw threaded portion 61 of the piston rod 13, adapted when the piston rod 13 moves rearwardly to engage a coacting clutch element 62 secured to the rear wall 20 of the transmission case and thereby to force the rod to rotate and, upon forward movement, to disengage from the clutch element 62 and engage a thrust bearing 63 so as to allow the clutch element 62 to freely rotate and the piston rod 13 to advance without rotation.

We claim:

1. In a hydraulic drive mechanism, a cylinder, a reciprocable piston therein, means for alternately delivering fluid under pressure to said cylinder on opposite sides of said piston for driving the same back and forth, a port in the side wall of said cylinder, adapted to be uncovered by said piston at the end of its stroke, and means for varying the effective dimension of said port in an axial direction so as to vary the point of piston stroke at which the port is uncovered.

2. In a hydraulic drive mechanism, a cylinder, a reciprocable piston therein, means for alternately delivering fluid under pressure to said cylinder on opposite sides of said piston for driving the same back and forth, and means for varying the stroke of said piston, comprising an escape port in a side wall of said cylinder, and a valve element partially filling said port and adjustable axially therein so as to variably restrict the axial dimension thereof for varying the point of uncovering of said port by the piston.

3. In a hydraulic drive mechanism, a cylinder, a reciprocable piston therein, means for alternately delivering fluid under pressure to said cylinder on opposite sides of said piston for driving the same back and forth, and means for varying the stroke of said piston, comprising a valve chamber formed in a side wall of said cylinder, said wall having a fluid escape port communicating with said valve chamber, and an axially adjustable valve in said chamber including a key portion extending into said port, partially filling the same and variably restricting the axial dimension thereof for varying the point of uncovering of said port by the piston.

4. In a hydraulic drive mechanism, a cylinder, a reciprocable piston therein, means for alternately delivering fluid under pressure to said cylinder on opposite sides of said piston for driving the same back and forth, and means for varying the stroke of said piston, comprising a valve chamber formed in a side wall of said cylinder, said wall having a fluid escape port communicating with said valve chamber, a key-shaped valve axially movable in said chamber, adjusting means including a screw extending through an external wall of said valve chamber and into the valve element and cooperating therewith for moving the same axially in the chamber, said valve element having a key portion projecting into said port, partially filling the same, and variably restricting the axial dimension thereof for varying the point of uncovering of said point by the piston.

5. In a hydraulic drive mechanism, a cylinder, a reciprocable piston therein, means for alternately delivering fluid under pressure to said cylinder on opposite sides of said piston for driving the same back and forth, and means for varying the stroke of said piston, comprising a valve chamber formed in a side wall of said cylinder, said wall having a fluid escape port communicating with said valve chamber, and an axially adjustable valve in said chamber having a key portion projecting into said port, variably restricting the axial dimension thereof for varying the point of uncovering of said port by the piston, and having an axial duct through which the fluid coming from said port may escape through the valve.

6. In a hydraulic drive mechanism, a cylinder, a reciprocable piston therein, means for alternately delivering fluid under pressure to said cylinder on opposite sides of said piston for driving the same back and forth, and means for varying the stroke of said piston, comprising a cylindrical valve chamber formed in a side wall of said cylinder, said wall having a fluid escape port communicating with said valve chamber and an adjusting element extending through an exterior wall of said valve chamber and cooperating with one end of said sleeve portion for adjusting the valve axially, the other end of said sleeve portion providing a duct for escape of the fluid through said valve.

7. In a hydraulic drive mechanism, a cylinder, a reciprocable piston therein, means for alternately delivering fluid under pressure to said cylinder on opposite sides of said piston for driving the same back and forth, and means for varying the stroke of said piston, comprising a cylindrical valve chamber formed in a side wall of said cylinder, said wall having a fluid escape port communicating with said valve chamber, a valve including a cylindrical sleeve portion axially slidable in said chamber and a key portion projecting into said port, partially filling the same, and variably restricting the axial dimension thereof for varying the point of uncovering of said port by the piston, an adjusting screw extended through an exterior wall of said valve chamber along the axis of said chamber, and into said sleeve portion, a pin mounted in said sleeve portion and coacting with a helical groove of said adjusting screw whereby rotation of the adjusting screw will move the valve axially, a hand wheel on the outer end of said adjusting screw, and means cooperating with said hand wheel for indicating the position of adjustment of said adjusting element.

8. In a hydraulic drive mechanism, a cylinder, a reciprocable piston therein, means for alternately delivering fluid under pressure to said cylinder on opposite sides of said piston for driving the same back and forth, and means for varying the stroke of said piston, comprising a valve chamber formed in a side wall of said cylinder, said wall having a fluid escape port communicating with said valve chamber, and an axially adjustable valve in said chamber having a key portion extending into said port and variably restricting the axial dimension thereof for varying the point of uncovering of said port by the piston, the inner end of said key portion being shaped to form a continuation of the cylindrical inner surfaces of the cylinder.

9. In a hydraulic drive mechanism, a cylinder, a reciprocable piston therein, means for alternately delivering fluid under pressure to said cylinder on opposite sides of said piston for driving the same back and forth, a port in the side wall of the cylinder, a fixed extremity of which is adapted to be uncovered by one side of said piston at one end of the piston stroke, and the opposite extremity of which is adapted to be uncovered by the other side of the piston at the other end of the piston stroke, and means for axially adjusting said last mentioned extremity of the port so as to vary the point of piston travel at which the port is uncovered and thereby vary the length of the piston stroke.

HAROLD N. BLISS.
GEORGE E. FENTON.